UNITED STATES PATENT OFFICE.

HERMANN BOEDEKER, OF HÖCHST-ON-THE-MAIN, GERMANY, ASSIGNOR TO THE FARBWERKE, VORMALS MEISTER, LUCIUS & BRÜNING, OF SAME PLACE.

SULFONATED DICHLORDIETHYLRHODAMIN AND PROCESS OF MAKING SAME.

SPECIFICATION forming part of Letters Patent No. 649,716, dated May 15, 1900.

Application filed May 26, 1899. Serial No. 718,408. (Specimens.)

*To all whom it may concern:*

Be it known that I, HERMANN BOEDEKER, Ph. D., a citizen of the Empire of Germany, residing at Höchst-on-the-Main, Germany, have invented certain new and useful Improvements in the Manufacture of new Rhodamin Dyestuffs, of which the following is a specification.

I have found that by the action of monoethylamin upon dichlorfluoresceïnchlorid (derivative of dichlorphthalic acid) and subsequent sulfonation of the dichlordiethylrhodamin thus formed a new valuable dyestuff may be obtained.

The manufacture of the symmetrical dichlordiethylrhodamin is illustrated by the following example: Forty-five kilos of the hydrochlorid of monoethylamin, thirty-six kilos of chlorid of zinc, sixty kilos of dichlorfluoresceïn chlorid, and thirty kilos of quicklime (or the equivalent quantity of another appropriate base) are heated to 200° centigrade. The mass begins to melt gradually, assuming a dark-red color and finally a metallic luster. It is heated while stirring till the bubbles cease and the melt has become refractory. It is then pulverized and boiled several times while adding hydrochloric acid. The dichlordiethylrhodamin remains insoluble. It is filtered and dried. It forms a bright-red powder, insoluble in water, sparingly in hot not too-diluted hydrochloric acid, with a red-yellow color. This solution becomes blue pink on dilution with water, when part of the dyestuff separates as bluish-red flakes. In concentrated sulfuric acid it dissolves with a light-yellow color, which on addition of water becomes first red yellow, then bluish pink, and finally the dyestuff is precipitated in red flakes. Alcohol dissolves it with a vivid yellow-red color and strong green fluorescence, which disappears on addition of alkali. The product dyes silk a beautiful bluish red.

To transform this dyestuff insoluble in water to one soluble in water, I treat it with sulfonating agents, as illustrated by the following example: Twenty-five kilos of the dyestuff are dissolved in one hundred and fifty kilos of monohydrate at about 40° centigrade, to which are slowly and carefully added, so as not to exceed the temperature of 35° to 40° centigrade, one hundred and fifty kilos of fuming sulfuric acid of twenty per cent. The whole is stirred for about three hours till a test of it easily dissolves in carbonate of sodium. It is then poured into cold water, the precipitated sulfonic acid is filtered off, dissolved in carbonate of sodium, and the filtered solution of sodium salt is evaporated to dryness. The dyestuff thus obtained is a dark-red mass of metallic luster and forms when pulverized a dark-red powder. It is easily soluble in water with a beautiful red color and green fluorescence, from the solution of which mineral acids separate the free sulfonic acid in blue-red flakes.

Concentrated sulfuric acid dissolves the dyestuff with a light-yellow color, which on addition of water becomes yellow red and finally bluish pink.

The sulfonated dichlordiethylrhodamin dyes wool in very pure and vivid bluish-red tints.

Having now described my invention, what I claim is—

1. The herein-described process of manufacturing sulfonated dichlordiethylrhodamin soluble in alkali, which consists in treating the dichlordiethylrhodamin obtained from dichlorfluoresceïnchlorid and monoethylamin with anhydrous sulfuric acid, substantially as set forth.

2. As a new product, the blue-red dyeing rhodamin dyestuff obtained from dichlordiethylrhodamin by sulfonation and solution in carbonate of sodium, being a dark-red powder of metallic luster, easily soluble in water with a red color and green fluorescence, precipitated from its aqueous solution by means of mineral acids in blue-red flakes, soluble in concentrated sulfuric acid with a light-yellow color, substantially as set forth.

In testimony that I claim the foregoing as my invention I have signed my name in presence of two subscribing witnesses.

HERMANN BOEDEKER.

Witnesses:
HEINRICH HAHN,
ALFRED BRISBOIS.